(12) United States Patent
Wakayama et al.

(10) Patent No.: US 8,707,842 B2
(45) Date of Patent: Apr. 29, 2014

(54) CUTTER WHEEL, MANUFACTURING METHOD FOR SAME, MANUAL SCRIBING TOOL AND SCRIBING DEVICE

(75) Inventors: Haruo Wakayama, Suita (JP); Tetsuji Shiozawa, Iida (JP); Takashi Sekijima, Iida (JP); Noriyuki Ogasawara, Iida (JP); Hiroshi Soyama, Ibaraki (JP)

(73) Assignee: Mitsuboshi Diamond Industrial Co., Ltd., Osaka (JP)

( * ) Notice: Subject to any disclaimer, the term of this patent is extended or adjusted under 35 U.S.C. 154(b) by 169 days.

(21) Appl. No.: 13/032,692

(22) Filed: Feb. 23, 2011

(65) Prior Publication Data

US 2011/0138986 A1 Jun. 16, 2011

Related U.S. Application Data

(62) Division of application No. 11/572,154, filed as application No. PCT/JP2005/013158 on Jul. 15, 2005.

(30) Foreign Application Priority Data

Jul. 16, 2004 (JP) ................................ 2004-236217

(51) Int. Cl.
*B31B 1/25* (2006.01)

(52) U.S. Cl.
USPC ............................................. 83/879; 83/886

(58) Field of Classification Search
USPC .......... 83/861–879; 33/27.031, 32.3; 451/548
See application file for complete search history.

(56) References Cited

U.S. PATENT DOCUMENTS

| 4,266,458 | A | 5/1981 | Rogers |
| 4,891,885 | A | 1/1990 | Fischer et al. |
| 5,836,229 | A | 11/1998 | Wakayama et al. |
| 6,314,778 | B1 | 11/2001 | Moro et al. |
| 6,796,212 | B2 | 9/2004 | Maekawa |
| 7,523,846 | B2 | 4/2009 | Takamatsu et al. |
| 7,717,311 | B2 | 5/2010 | Nishio |
| 2002/0038594 | A1 | 4/2002 | Maekawa et al. |

(Continued)

FOREIGN PATENT DOCUMENTS

| JP | 58-090333 | 5/1983 |
| JP | 62-238036 | 10/1987 |

(Continued)

OTHER PUBLICATIONS

Notice of Reasons for rejection of Japanese Appln. No. 2006-529184 dated Sep. 20, 2011 with partial English translation.

(Continued)

*Primary Examiner* — Omar Flores Sanchez
(74) *Attorney, Agent, or Firm* — Antonelli, Terry, Stout & Kraus, LLP.

(57) ABSTRACT

A cutter wheel for scribing a brittle material substrate having excellent biting in the surface of the brittle material substrate when the brittle material substrate used for a liquid crystal display panel or the like is cut and a method for manufacturing the cutter wheel with high productivity are provided. The cutter wheel made of a hard metal or sintered diamond is formed in such a manner that a V-shaped ridge line part is formed as an edge along the circumferential part of a disk-like wheel, and at least one notch is engraved in the above described ridge line part and notches as that described above are formed in the entirety of the periphery of the above described ridge line part at a pitch of more than 200 μm.

5 Claims, 13 Drawing Sheets

(56) References Cited

U.S. PATENT DOCUMENTS

| | | |
|---|---|---|
| 2004/0123717 A1 | 7/2004 | Maekawa et al. |
| 2005/0245051 A1 | 11/2005 | Maekawa |
| 2006/0042433 A1 | 3/2006 | Maekawa |

FOREIGN PATENT DOCUMENTS

| | | |
|---|---|---|
| JP | 04-066238 | 3/1992 |
| JP | 04-152020 | 5/1992 |
| JP | 06-126365 | 5/1994 |
| JP | 09-188534 | 7/1997 |
| JP | 3085312 U | 2/2002 |
| JP | 2002-210532 | 7/2002 |

OTHER PUBLICATIONS

Decision of Rejection of Japanese Appln. No. 2006-529184 dated Dec. 27, 2011 with partial English translation.
JIS B 0601, Definition and Representation of Surface Coarseness.

Fig.7

| sample | No. | examination of cutting; unit [MPa] | | | | | |
|---|---|---|---|---|---|---|---|
| | | G1 | | | G2 | | |
| | | Lth | high load region | | Lth | high load region | |
| | | | 0.15 | 0.20 | | 0.15 | 0.20 |
| A | 1 | 0.07 | ○ | × | 0.09 | ○ | × |
| | 2 | 0.07 | ○ | ○ | 0.09 | ○ | × |
| | 3 | 0.07 | ○ | ○ | 0.08 | ○ | ○ |
| | 4 | 0.08 | × | × | 0.09 | × | × |
| | 5 | 0.07 | ○ | ○ | 0.09 | ○ | ○ |
| B | 1 | 0.10 | ○ | ○ | 0.11 | ○ | ○ |
| | 2 | 0.09 | ○ | ○ | 0.11 | ○ | ○ |
| | 3 | 0.10 | ○ | ○ | 0.12 | ○ | ○ |
| | 4 | 0.09 | ○ | ○ | 0.10 | ○ | ○ |
| | 5 | 0.10 | ○ | ○ | 0.11 | ○ | ○ |
| C | 1 | 0.09 | ○ | ○ | 0.10 | ○ | ○ |
| | 2 | 0.09 | ○ | ○ | 0.11 | ○ | ○ |
| | 3 | 0.08 | ○ | ○ | 0.10 | ○ | ○ |
| | 4 | 0.09 | ○ | ○ | 0.11 | ○ | ○ |
| | 5 | 0.09 | ○ | ○ | 0.11 | ○ | ○ |
| D | 1 | 0.09 | ○ | ○ | 0.10 | ○ | ○ |
| | 2 | 0.09 | ○ | ○ | 0.12 | ○ | ○ |
| | 3 | 0.09 | ○ | ○ | 0.11 | ○ | ○ |
| | 4 | 0.09 | ○ | ○ | 0.10 | ○ | ○ |
| | 5 | 0.09 | ○ | ○ | 0.10 | ○ | ○ |
| E | 1 | 0.09 | ○ | ○ | 0.11 | ○ | ○ |
| | 2 | 0.09 | ○ | ○ | 0.10 | ○ | ○ |
| | 3 | 0.08 | ○ | ○ | 0.10 | ○ | ○ |
| | 4 | 0.09 | ○ | ○ | 0.10 | ○ | ○ |
| | 5 | 0.10 | ○ | ○ | 0.11 | ○ | ○ |

○: no sliding
×: sliding

Fig.8

| sample | specification of edge | No. | cut region | results |
|---|---|---|---|---|
| F | hard metal; without notches | 1 | 0.11~0.14MPa | Though biting tended to be gained with a low load, sliding easily occurred. Cut region was not stable. |
| | | 2 | 0.09~0.19MPa | |
| | | 3 | 0.08~0.09MPa | |
| | | 4 | 0.09~0.16MPa | |
| | | 5 | 0.10~0.13MPa | |
| G | hard metal; with notches created in accordance with rolling method | 1 | 0.13~<MPa | Inside cutting was stable and a large cut region could be secured. |
| | | 2 | 0.13~<MPa | |
| | | 3 | 0.11~<MPa | |
| | | 4 | 0.10~<MPa | |
| | | 5 | 0.12~<MPa | |
| H | sintered diamond; with notches created in accordance with polishing method | 1 | 0.13~<MPa | The same performance was gained as with Sample G. Inside cutting was stable and a large cut region could be secured. |
| | | 2 | 0.11~<MPa | |
| | | 3 | 0.12~<MPa | |
| | | 4 | 0.13~<MPa | |
| | | 5 | 0.11~<MPa | |

Fig.9

| Sample | No. | outer diameter (mm) | number of divisions | depth (μm) | pitch (μm) | cut region | evaluation |
|---|---|---|---|---|---|---|---|
| I | 1 | 3.1 | 25 | 1μm | 390 | 0.10~0.16 MPa<br>0.17 MPa: sliding | chipping occurred; large size |
| | 2 | 3.1 | 30 | | 325 | 0.09~0.18 MPa<br>0.19 MPa: sliding | |
| | 3 | 3.1 | 35 | | 280 | 0.10~0.20 MPa<br>0.21 MPa: sliding | |
| | 4 | 3.1 | 40 | | 240 | 0.11~0.19 MPa<br>0.20 MPa: sliding | |
| | 5 | 3.1 | 50 | | 200 | 0.14~<MPa | |
| | 6 | 3.1 | 60 | | 160 | 0.14~0.23 MPa<br>0.24 MPa: sliding | |
| | 7 | 3.1 | 70 | | 140 | 0.14~0.21 MPa<br>0.22 MPa: sliding | |
| | 8 | 3.1 | 90 | | 110 | 0.13~0.24 MPa<br>0.25 MPa: sliding | |
| | 9 | 3.1 | 110 | | 90 | 0.12~0.20 MPa<br>0.21 MPa: sliding | |
| | 10 | 3.1 | 170 | | 60 | 0.14~0.24 MPa<br>0.25 MPa: sliding | |
| | 11 | 3.1 | 230 | | 40 | 0.15~<MPa | chipping occurred; large size |
| J | 1 | 3.1 | 1 | 2μm | 9740 | 0.18 MPa | bite gained |
| | 2 | 3.1 | 2 | | 4870 | 0.18 MPa<br>0.17 MPa or less: sliding | sliding easily occurred<br>inside cutting was unstable |
| | 3 | 3.1 | 3 | | 3245 | 0.17 MPa<br>0.16 MPa or less: sliding | |
| | 4 | 3.1 | 4 | | 2430 | 0.11~<MPa | |
| | 5 | 3.1 | 5 | | 1950 | 0.13~0.24 MPa<br>0.25 MPa: sliding | sliding easily occurred in cutting with high load |
| | 6 | 3.1 | 10 | | 970 | 0.12~0.22 MPa<br>0.23 MPa: sliding | |
| | 7 | 3.1 | 50 | | 200 | 0.12~<MPa | |
| K | 1 | 3.1 | 1 | 3μm | 9740 | 0.18 MPa | bite gained |
| | 2 | 3.1 | 2 | | 4870 | 0.11 MPa<br>0.12 MPa: sliding | sliding easily occurred |
| | 3 | 3.1 | 3 | | 3245 | 0.12~<MPa | |
| | 4 | 3.1 | 4 | | 2430 | 0.12~<MPa | inside cutting was unstable |
| | 5 | 3.1 | 5 | | 1950 | 0.12~<MPa | |
| | 6 | 3.1 | 10 | | 970 | 0.12~<MPa | |
| | 7 | 3.1 | 50 | | 200 | 0.15~<MPa | |

CUTTER WHEEL, MANUFACTURING METHOD FOR SAME, MANUAL SCRIBING TOOL AND SCRIBING DEVICE

CROSS-REFERENCE TO RELATED APPLICATION

This application is a divisional application of U.S. application Ser. No. 11/572,154, filed Jun. 22, 2007, the contents of which are incorporated herein by reference, which is a 371 of International Application No. PCT/JP2005/013158, filed Jul. 15, 2015.

TECHNICAL FIELD

The present invention relates to a cutter wheel for scribing a brittle material substrate where a V-shaped ridge line part is formed as an edge along the circumferential part of a disk-like wheel, a manufacturing method for the same, a manual scribing tool and a scribing device.

BACKGROUND TECHNOLOGY

Panels used in flat panel displays (hereinafter referred to as FPD's) are usually formed by cutting a mother substrate into a glass substrate of predetermined dimensions (unit substrate). Concretely, when a mother substrate is cut, scribe lines are created on the surface of a sheet of a mother substrate, and then, the above described substrate is broken along the created scribe lines.
Patent Document 1 discloses a technology for cutting a glass substrate using a cutter wheel.
FIG. 13 is a front diagram showing a well known scribing device used in the process for scribing a brittle material substrate.
The scribing method is described in reference to FIG. 13. Here, in the following description, the left-right direction is direction X and the direction perpendicular to the paper is direction Y in this figure.
As shown in FIG. 13, a scribing device 100 is provided with a table 150 which is horizontally rotatable and to which a mounted glass substrate G is secured using a vacuum suction means, a pair of guide rails 121 and 121 which are parallel to each other and support Table 150 so that Table 150 is moveable in direction Y, a ball screw 122 for moving Table 150 along guide rails 121 and 121, a guide bar 123 which is provided above Table 150 in direction X, a scribe head 130 which is provided on guide bar 123 so as to be slidable in direction X and applies a load to the edge of the below described cutter wheel 120, a motor 124 for sliding scribe head 130, a chip holder 140 which is provided at the lower end of scribe head 130 so as to be moveable upward and downward and which freely oscillates, a cutter wheel 120 which is attached to the lower end of chip holder 140 so as to be rotatable, and a pair of CCD cameras 125 which are provided above guide bar 123 and perceive alignment marks formed on glass substrate G placed on table 150.
FIG. 14 is a diagram showing an example of the process for cutting a mother substrate into unit substrates.
The method for cutting glass substrate G is described in reference to FIG. 14.
(1) First, as shown in FIG. 14(a), glass substrate G is mounted on the scribe table of the scribing device, and the upper surface (surface A) of the glass substrate is scribed using cutter wheel 120, so that a scribe line Sa is created. Vertical cracks created as scribe line Sa usually have a depth of 10% to 15% of the plate thickness of glass substrate G.

(2) Next, the above described glass substrate G is turned over and the above described glass substrate G is conveyed to a breaking device. Then, as shown in FIG. 14(b), a breaking bar 3 is pressed against the upper surface (surface B) of glass substrate G mounted on a mat 4 along the line facing scribe line Sa in this breaking device. As a result, the crack spreads upward from scribe line Sa on the surface A on the lower side of glass substrate G, and thus, glass substrate G is broken along scribe line Sa.
Each of the above described processes (1) and (2) is repeated once or a number of times depending on the type of glass substrate G, and therefore, glass substrate G is cut into unit substrates.
That is to say, in the case where glass substrate G is a single substrate, it is cut into unit substrates by carrying out each of the above described scribing and breaking once, while in the case where glass substrate G forms a liquid crystal display panel, the glass substrate to be cut is made up of glass substrates that are pasted together, and the processes (1) and (2) are carried out again after the above described breaking, and thus, the glass substrate is cut into unit substrates.
In the manufacture of a TFT liquid crystal display panel, for example, a TFT substrate and a color filter are pasted together and cut into unit substrates through scribing and breaking, each carried out two times, and after that, liquid crystal is injected into the gap between the TFT substrate and the color filter substrate which are pasted together, and thus, a liquid crystal display panel is gained. In recent years, mother substrates have increased in size, together with the increase in the size of display screens and rise in the demand for liquid crystal substrates. Accordingly, it has become difficult to turn over glass substrate G after scribing and convey glass substrate G to the breaking device as described above. Furthermore, mother substrates from the fifth generation onward (for example 1100 mm×1250 mm) have been cut into unit substrates through scribing and breaking, each carried out two times, after liquid crystal is injected through dripping. Therefore, when glass substrate G is turned over using, for example, a vacuum suction means, for breaking after liquid crystal has been injected through dripping, the space between the two substrates partially expands, causing a problem such that the gap between the substrates becomes uneven.
In the cutter wheel 10 for scribing a brittle material substrate of Patent Document 1, as shown in FIGS. 18 and 19, a V-shaped ridge line part 11 is formed as an edge along the circumferential part of a disk-like wheel, and furthermore, a number of protrusions 10a are formed in the above described ridge line part with a short pitch. When a scribe line is created using cutter wheel 10, cutting becomes possible without the breaking process being required, by applying scribing pressure for the formation of vertical cracks on the surface of the glass substrate with protrusions 10a, so that deep vertical cracks that reach no less than 80% of the substrate thickness extend in the vertical direction from the surface of the glass substrate.
Thus, cutter wheel 10 of Patent Document 2 has a high seepage force for glass substrates, making the glass substrate after scribing of an almost completely cut state, even without a breaking process being carried out, and therefore, the process for turning over a glass substrate in order to carry out a breaking process afterward can be omitted.
Patent Document 1: Japanese Unexamined Patent Publication S59 (1984)-8632
Patent Document 2: Japanese Patent No. 3,074,143

DISCLOSURE OF THE INVENTION

Problem to be Solved by the Invention

As described above, mother substrates used in liquid crystal display panels and the like have increased in size in recent years, and therefore, conveyance of large scale mother substrates, including moving and turning over, has become difficult, because the weight and the amount of bending increase relative to the thickness of the mother substrate.

Therefore, in order to solve the above described problems with mother substrates, material makers who manufacture material plate glass for making mother substrates have developed mother substrates having a light weight and little bending, as a result of improvement in the material quality of glass and surface processing. Thus improved glass (hereinafter referred to as "improved large scale glass" for the sake of convenience) has defects such that the bite of the edge is poor, though ease of handling at the time of conveyance is improved.

Meanwhile, when a scribe line is created in a glass substrate in the above described conventional scribing device 100 (FIG. 13), as shown in, for example, FIG. 15, cutter wheel 120 is placed at a point slightly outside the end of glass substrate G and lowered, so that the bottom end of cutter wheel 120 is located slightly beneath the upper surface of glass substrate G, and moved horizontally in a state where a predetermined scribing pressure is applied to cutter wheel 120, and thus, scribing starts from the end surface of glass substrate G. This method for scribing is referred to as "outside cutting."

In the case of the above outside cutting, cutter wheel 120 hits the end surface of glass substrate G when it rolls on glass substrate G, and therefore, there is a risk that the end surface of glass substrate G may chip or cutter wheel 120 may be damaged.

Therefore, a method according to which, as shown in FIG. 16, cutter wheel 120 is first moved to the point slightly inside the end of glass substrate G above glass substrate G, and then, cutter wheel 120 is lowered and moved horizontally to the right in the figure over glass substrate G in a state where a predetermined scribing pressure is applied to cutter wheel 120 which makes contact with glass substrate G, and thus, scribing is started, is used. This method for scribing is referred to as "inside cutting."

When scribing is started for inside cutting, however, a phenomenon can be observed where cutter wheel 120 slides on the surface of glass substrate G and the edge fails to bite into glass substrate G on the surface. When this phenomenon is observed, this is referred to as "the biting of the edge being poor." The above described phenomenon becomes significant in the operation of scribing improved large scale glass, and therefore, development of an edge having excellent bite has become required.

This invention is provided in view of this new need, and an object thereof is to provide a cutter wheel for scribing a brittle material substrate having excellent bite on the surface of a brittle material substrate when the brittle material substrate is cut, a manufacturing method for the same, a manual scribing tool and a scribing device.

Means for Solving Problem

As a result of diligent research on the form and the number of notches created in the edge of cutter wheels, the present inventors completed a cutter wheel for scribing a brittle material substrate having excellent bite on the surface of substrates and high productivity, a manufacturing method for the same, a manual scribing tool and a scribing device.

That is to say, this invention provides a cutter wheel for scribing a brittle material substrate where a V shaped ridge line part is formed as an edge along the circumferential part of a disk-like wheel made of a hard metal or sintered diamond, characterized in that at least one notch is engraved in the above described ridge line part and notches as that described above are created in the entirety of the periphery of the above described ridge line part with a pitch of more than 200 μm.

Another aspect of this invention provides a manufacturing method for a cutter wheel for scribing a brittle material substrate where a V-shaped ridge line part is formed as an edge along the circumferential part of a disk-like wheel made of a hard metal or sintered diamond, characterized in that a cutter wheel is rolled over a tool for engraving notches made of a material which is harder than the ridge line part of the above described cutter wheel where at least one protrusion is formed while making contact with protrusions as that described above while pressure is applied, and thereby, at least one notch is engraved in the above described ridge line part.

Still another aspect of this invention provides the cutter wheel according to the above described invention where notches are engraved by rolling the cutter wheel over a tool for engraving notches made of a material which is harder than the ridge line part of the above described cutter wheel where at least one protrusion is formed while making contact with the part having protrusions while pressure is applied.

In the case where a V-shaped ridge line part is formed as an edge along the circumferential part of a disk-like wheel, notches in these inventions are recesses in trench form partially engraved in this edge in the direction approximately perpendicular to the ridge line part or in a direction diagonally crossing the ridge line part. The notches have a corner in at least one end part in the direction of the ride line.

According to these inventions, when the cutter wheel rolls over a brittle material substrate, a corner as that described above of the notches formed in the ridge line part bites into the brittle material substrate, causing the edge to catch in the brittle material substrate, and thereby, a starting point of scribing can be created.

Taking this into consideration, the pitch of the notches in these inventions is defined so as to reflect the intervals of the starting points of scribing which are created in a brittle material substrate when a corner of notches in the direction of the ridge line of the edge bites into the brittle material substrate. Accordingly, these inventions provide a cutter wheel where one notch is created in the circumferential part of the wheel and a cutter wheel where two or more notches are created.

Here, notches in these inventions are artificially formed in the ridge line of the edge and do not include those which are accidentally created through damaging, for example nicks on the edge or deterioration from aging.

In addition, these inventions provide a manual scribing tool where a cutter wheel for scribing a brittle material substrate according to the present invention is attached to a holder provided at an end of a handle so as to be rotatable around an axis.

Furthermore, these inventions provide an automatic scribing device having a mechanism where a cutter head moves in at least one direction relative to a brittle material substrate mounted on a table (for example in at least one of the two directions; either direction X or direction Y), wherein the above described cutter head is provided with a cutter wheel for scribing a brittle material substrate according to the present invention. Here, in this invention, the cutter head is formed of a cutter wheel and a chip holder which supports the cutter wheel around an axis so that the cutter wheel can roll over a substrate.

Effects of the Invention

In a cutter wheel for scribing a brittle material substrate according to the present invention, a V-shaped ridge line part is formed along the circumferential part of a disk-like wheel as an edge, at least one notch is engraved in the above described ridge line part and notches as that described above are created in the entirety of the periphery of the above described ridge line part with a pitch of more than 100 μm, preferably with a pitch of more than 200 μm. As a result, excellent biting can be gained on the surface of a brittle material substrate. Here, it is more preferable for the notches to be created so as to have a depth of no less than 3 μm in the entirety of the periphery of the above described ridge line part, in order to gain excellent biting. Here, it is sufficient for the notches to be formed at a depth of no greater than 5 μm.

In the cutter wheel for scribing a brittle material substrate according to this invention, the above described V-shaped ridge line part is formed of two slanted surfaces which converge toward the outside in the direction of the radius, and the circumferential ridge line formed of the above described two converging slanted surfaces has microscopic unevenness where the average coarseness Ra along the center line of the above described unevenness exceeds 0.40 μm. Here, "average coarseness Ra along the center line" in this invention is one of the parameters for prescribing the coarseness on the surface of industrial products prescribed in JIS B 0601, and an arithmetic average value on the surface of objects sampled at random.

In the case where a number of notches are created in the entirety of the periphery of the above described ridge line part with a random pitch and/or depth, control of the processing precision at the time of engraving of notches becomes almost completely unnecessary, and excellent bite of the edge can be gained.

In accordance with a manufacturing method for a cutter wheel for scribing a brittle material substrate according to this invention, when at least one notch is engraved in the V-shaped ridge line part of a cutter wheel where the above described ridge line part is formed along the circumferential part of a disk-like wheel as an edge, a cutter wheel is rolled over a tool for engraving notches made of a material which is harder than the ridge line part of the above described cutter wheel where at least one protrusion is formed while making contact with protrusions as that described above while pressure is applied. As a result, the equipment required for engraving notches can be simplified, and the time for work can be significantly shortened in comparison with the prior art. In addition, this work of engraving is not affected by any difference in the experience and personal ability of the workers, and thus, the productivity becomes high.

BRIEF DESCRIPTION OF THE DRAWINGS

FIG. 7 is a table showing the evaluation of the degree of biting of cutter wheels in a glass substrate in Experiment 1;

FIG. 8 is a table showing the evaluation of the degree of biting of cutter wheels in a glass substrate in Experiment 2;

FIG. 9 is a table showing the evaluation of the degree of biting of cutter wheels in a glass substrate in Experiment 3;

Figure 1:
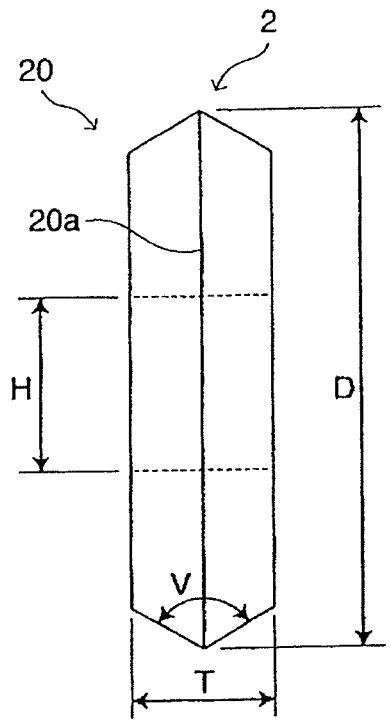
FIG. 1 is a front diagram showing a cutter wheel according to one embodiment of this invention as viewed in the direction perpendicular to the rotational axis of the cutter wheel.

EXPLANATION OF SYMBOLS 2 edge
10 cutter wheel (according to prior art)
10a protrusions
20 cutter wheel
20a ridge line part
20b notches
30 device for engraving
31 tool for engraving notches
32 protrusions
50 cutter wheel
50b notches
60 cutter wheel
60b notches
90 manual scribing tool
100 scribing device
120 cutter wheel (according to prior art)

BEST MODE FOR CARRYING OUT THE INVENTION

In the following, the preferred embodiments of this invention are described in detail in reference to the drawings.
Here, brittle material substrates in the present invention are not particularly limited in terms of the form, quality of material, application and size, and may be substrates made of a single substrate, pasted substrates where two or more single substrates are pasted together, or substrates where a thin film or a semiconductor material is attached on the surface or included inside such substrates.

As the material for the brittle material substrates in the present invention, glass, ceramic, silicon, sapphire and the like can be cited, and as the application thereof, flat display panels, such as liquid crystal panels, plasma display panels and organic EL display panels, can be cited. In addition, in the case of a reflection type substrate, from among substrates for a projector, referred to as LCOS, a pair of brittle substrates where a quartz substrate and a semiconductor wafer are pasted together is used, and such brittle material substrates are also included.

Though in the following embodiments, the form of cutter wheels according to this invention is illustrated, the cutter wheels of this invention are not limited to this.

Embodiment 1

A cutter wheel 20 according to an embodiment of this invention is described in reference to FIGS. 1 and 2.

FIG. 1 is a front diagram showing cutter wheel 20 as viewed in the direction perpendicular to the rotational axis, and FIG. 2 is a side diagram showing the cutter wheel of FIG. 1.

Figure 13:
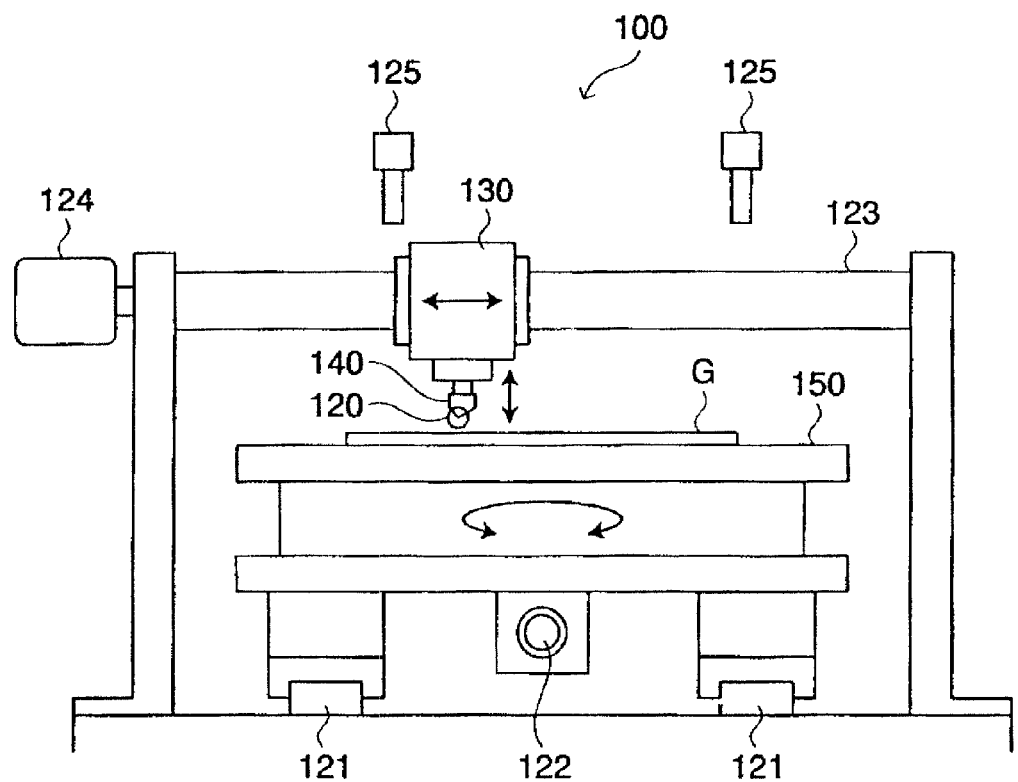
FIG. 13 is a front diagram showing a well known scribing device used in the work of scribing.
Figure 14:
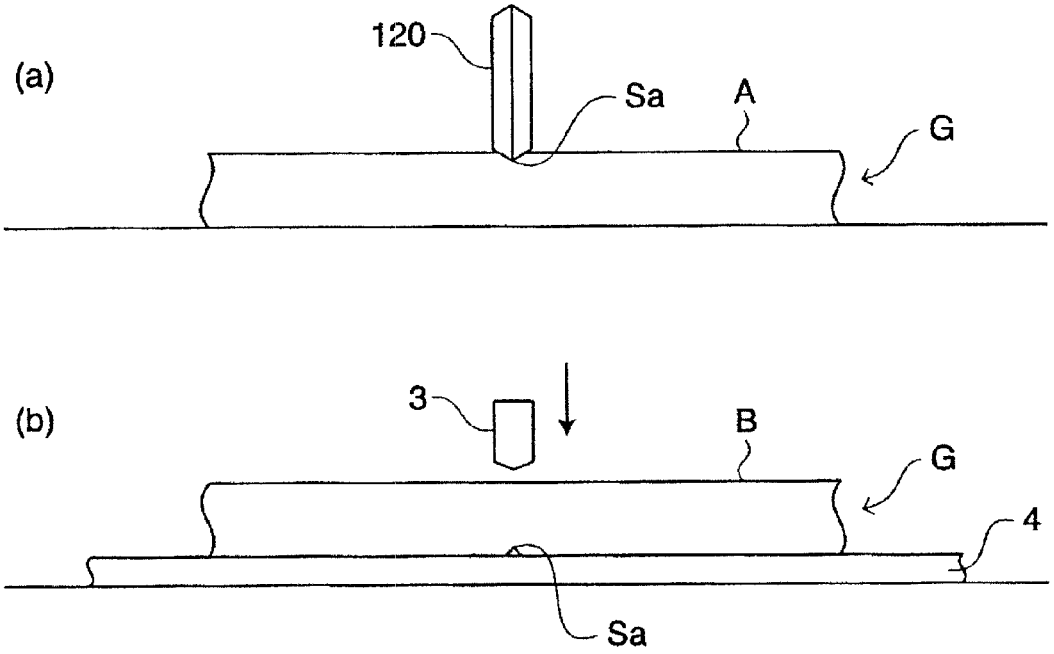
FIG. 14 is a diagram illustrating an example of the process for cutting a mother substrate into unit substrate according to the prior art.
Figure 15:
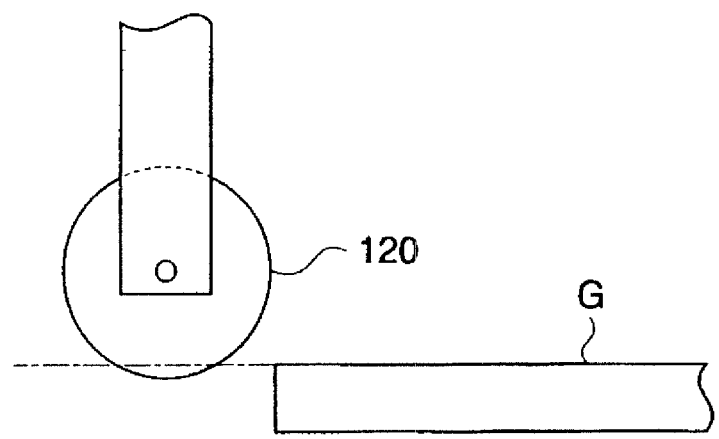
FIG. 15 is a diagram illustrating a well known method for scribing through outside cutting using a cutter wheel.
Figure 16:
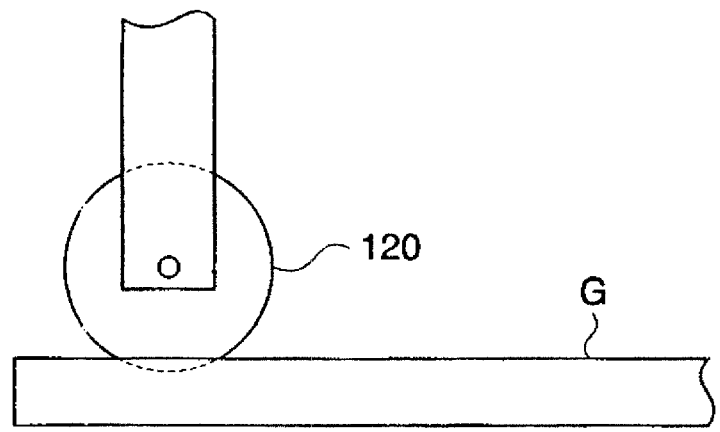
FIG. 16 is a diagram illustrating a well known method for scribing through inside cutting using a cutter wheel.

Here, cutter wheel 20 is a cutter wheel which can be mounted on a chip holder 140 in the conventional scribing device 100 described in reference to FIG. 13.

As shown in FIG. 1, cutter wheel 20 is in disk form with an outer diameter D of the wheel and a thickness T of the wheel, and an edge 2 with an edge angle V is formed in the outer peripheral part of the wheel.

Figure 2A:
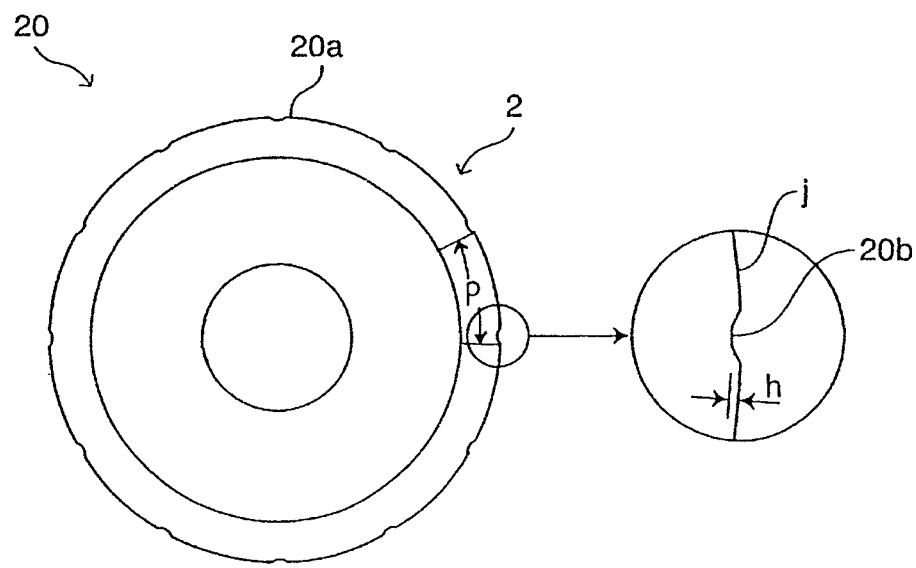
FIGS. 2A and 2B are side diagrams of the cutter wheel of FIG. 1.
Figure 2B:
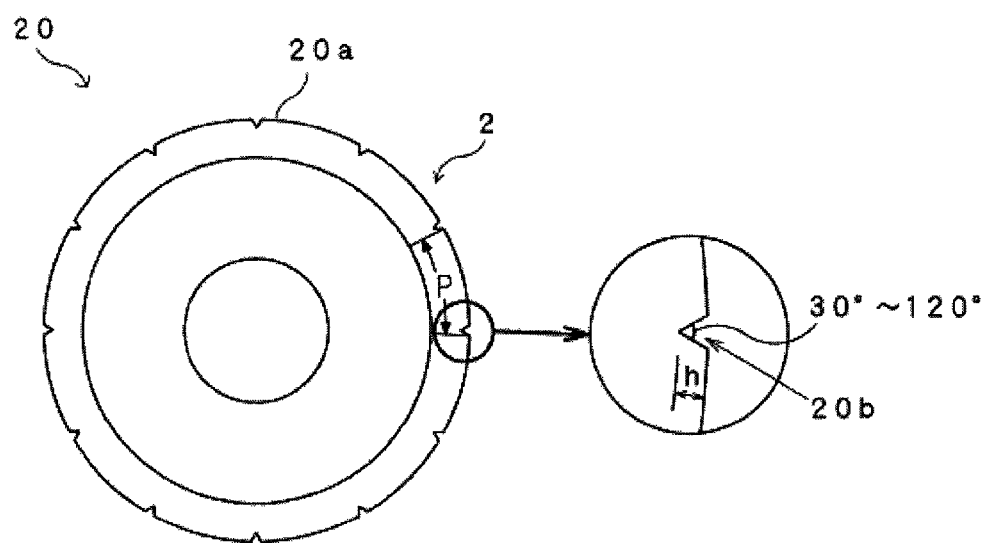

Furthermore, as shown in FIGS. 1, 2A and 2B, in cutter wheel 20, unevenness is created in a ridge line part 20a where edge 2 is formed. That is to say, U-shaped (FIG. 2A) or V-shaped (FIG. 2B) notches 20b are created in this example, as shown in the diagrams showing enlarged parts of FIGS. 2A and 2B. Notches 20b are created by providing notches having a depth h in the flat ridge line part 20a with a pitch P. Ridge line parts 20a which are longer than the length of notches 20b in the direction of the circumference remain between adjacent notches 20b.

V-shaped ridge line parts 20a are formed of two slanted surfaces which converge toward the outside in the direction of the radius, and the outer peripheral part of ridge line parts 20a formed of the above described two converging slanted surfaces has microscopic unevenness where the average coarseness Ra along the center line of the above described unevenness exceeds 0.40 μm.

In reference to FIGS. 3 to 6, a device for engraving notches 20b in cutter wheel 20 and a method for engraving according to the embodiments of this invention are described.

Figure 3:
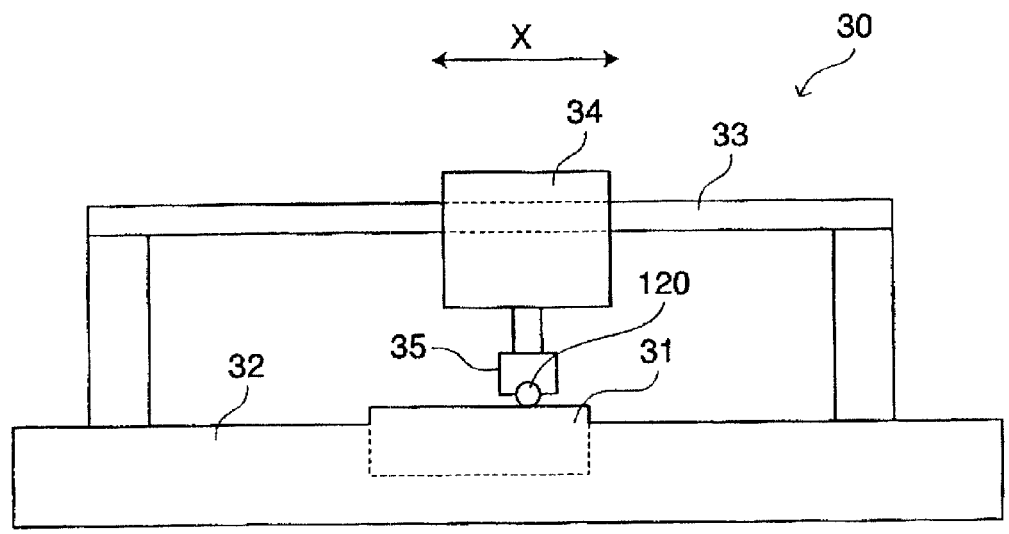
FIG. 3 is a front diagram showing a device for engraving notches in the cutter wheel of FIG. 1.

FIG. 3 is a front diagram showing a device for engraving notches 20b in cutter wheel 20.

As shown in FIG. 3, an engraving device 30 is provided with a tool for engraving notches 31, a base 32 for fixing tool for engraving notches 31, a guide bar 33 provided above base 32, an engraving head 34 for applying a load for engraving to the below described cutter wheel 120, which is provided with a motor for moving the head in direction X along guide bar 33 in the drawing, and a chip holder 35 which is provided at the lower end of engraving head 34 so as to be moveable upward and downward and to which cutter wheel 120 is attached so as to be removable.

A controller, not shown, for setting the load for engraving which is applied to cutter wheel 120 and the distance of movement in direction X is connected to engraving head 34.

Figure 4:
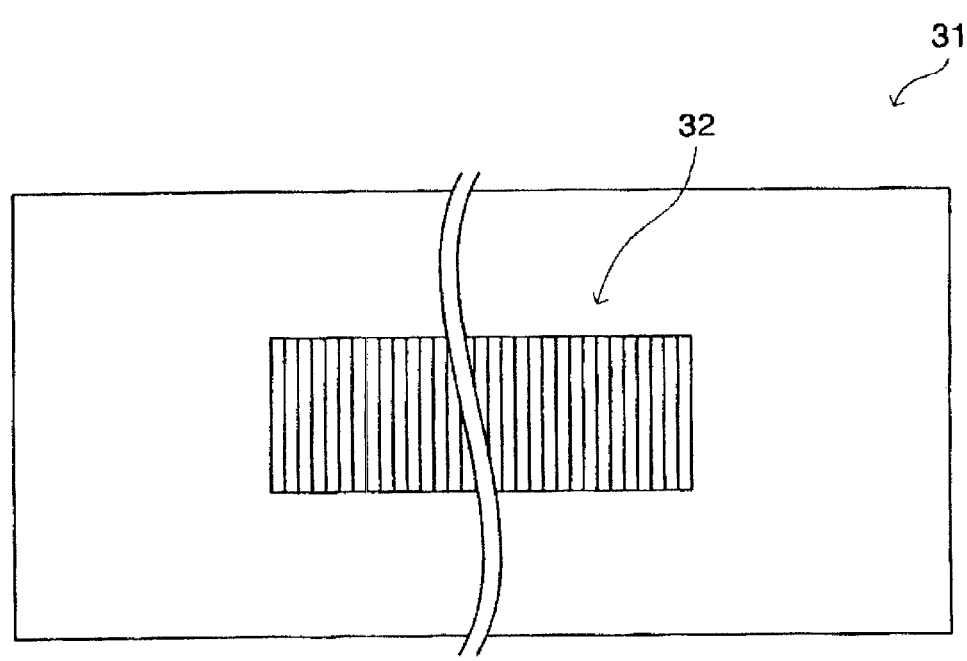
FIG. 4 is a plan diagram showing a tool for engraving notches which is secured to the device for engraving of FIG. 3.
Figure 5:
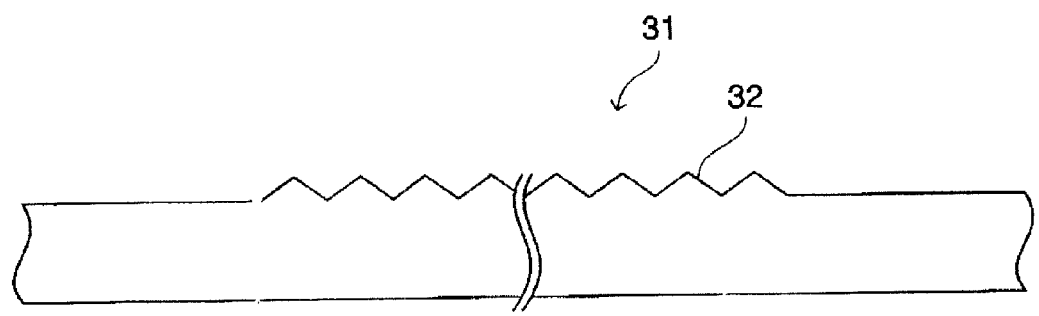
FIG. 5 is a front diagram showing the tool for engraving of FIG. 4.

FIG. 4 is a plan diagram showing tool for engraving notches 31, which is secured to engraving device 30, and FIG. 5 is a front diagram showing the tool of FIG. 4.

As shown in FIGS. 4 and 5, tool for engraving notches 31 is a plate-like member having a number of protrusions 32 in the center portion and made of a material that is harder than the edge of cutter wheel 120 in which notches 20b are engraved. In tool for engraving notches 31, trenches are engraved in the surface of a PCD (polycrystalline diamond) plate-like member having a flat surface, for example, through wire discharge, and thus, as shown in FIG. 5, a number of parallel protrusions 32 which are ridge line parts having a predetermined angle are formed at predetermined intervals. The ridge line parts of protrusions 32 are formed within a range of 30° to 120°.

Figure 6:
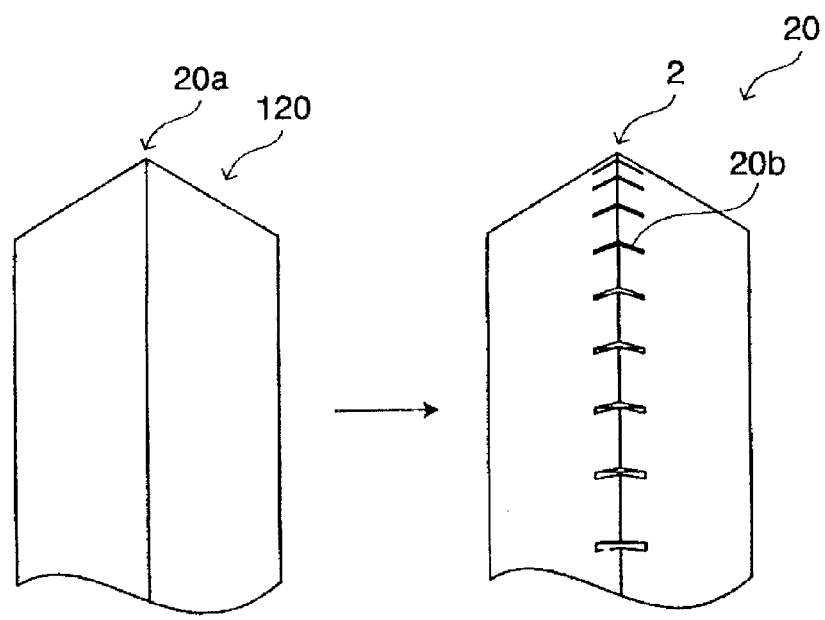
FIG. 6 is a front diagram showing a cutter wheel before notches are engraved (left side in the figure) and a cutter wheel where notches are engraved (right side in the figure)

A method for engraving notches 20b in cutter wheel 120 using engraving device 30 of FIG. 3 according to an embodiment is described in the following. FIG. 6 is a front diagram showing a cutter wheel 120 where no notches 20b are engraved (left side in the figure) and a cutter wheel 20 where notches 20b are engraved (right side in the figure).

Here, a hard metal is shown as an example of the material for cutter wheel 120.

First, cutter wheel 120 on the left side in FIG. 6 is mounted in chip holder 35 of engraving device 30 of FIG. 3.

Next, the load for engraving which is applied to cutter wheel 120 and the distance of movement of chip holder 35 in direction X are set in the controller of engraving head 34. The distance of movement of chip holder 35 is, for example, the length of the entirety of the periphery of cutter wheel 120.

Next, chip holder 35 is lowered, so that cutter wheel 120 makes contact with protrusion 32 at one end part and rotates while the set load for engraving is applied. After chip holder 35 has moved over the set distance of movement, chip holder 35 is raised.

As a result, notches 20b are created around the entirety of the periphery of ridge line part 20a of cutter wheel 120 at intervals which correspond to the intervals of protrusions 32, and thus, cutter wheel 20 is gained when removed from chip holder 35. See, FIG. 2B.

As described above, in the case where notches 20b are engraved in the entirety of the periphery of ridge line part 20a while cutter wheel 120 is rolled using engraving device 30, cutter wheel 20 can be mass produced in a short period of time, and therefore, the equipment can be simplified and the work of engraving is not affected by any difference in the experience or personal ability of the workers, and thus, the productivity significantly increases.

Figure 17:
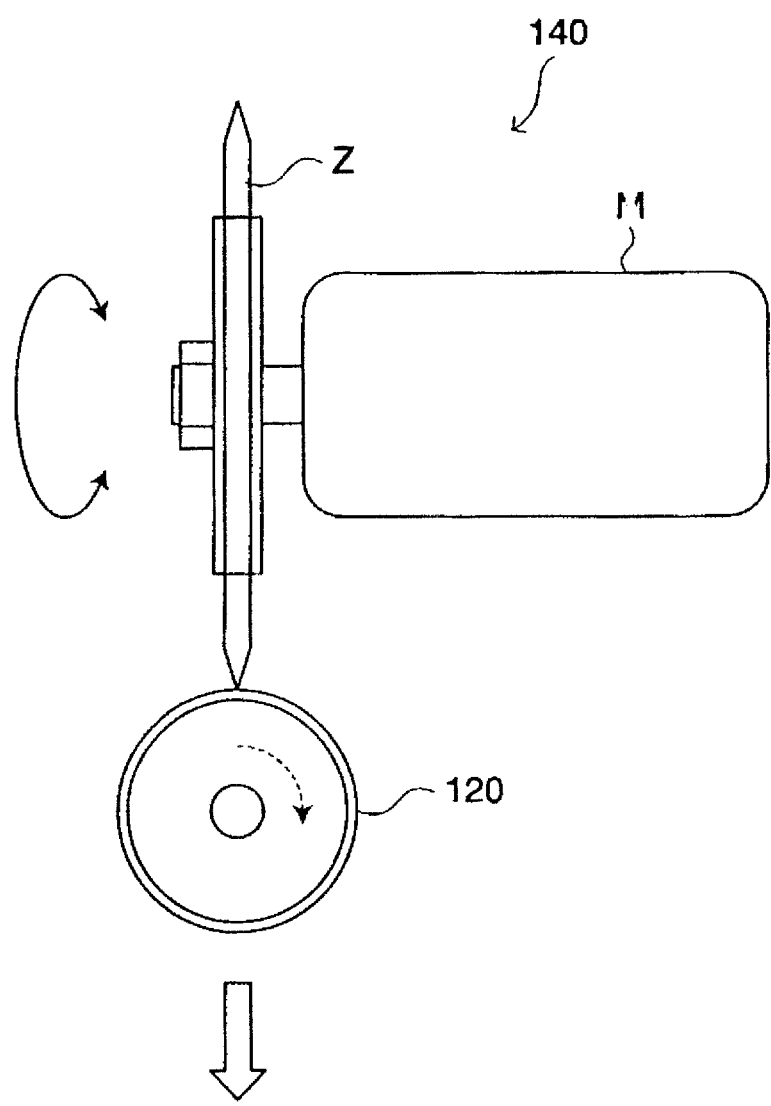
FIG. 17 is a diagram illustrating a conventional method for creating notches in the circumference of a cutter wheel.
Figure 18:
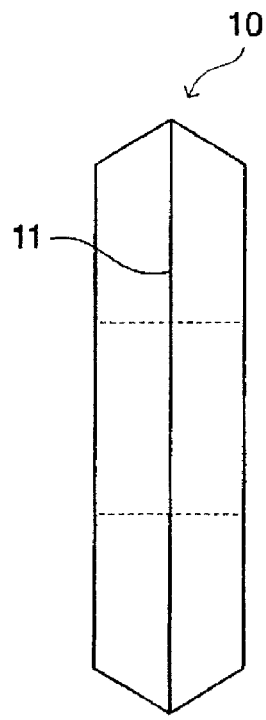
FIG. 18 is a front diagram showing an example of a conventional cutter wheel as viewed in the direction perpendicular to the rotational axis of the cutter wheel.
Figure 19:
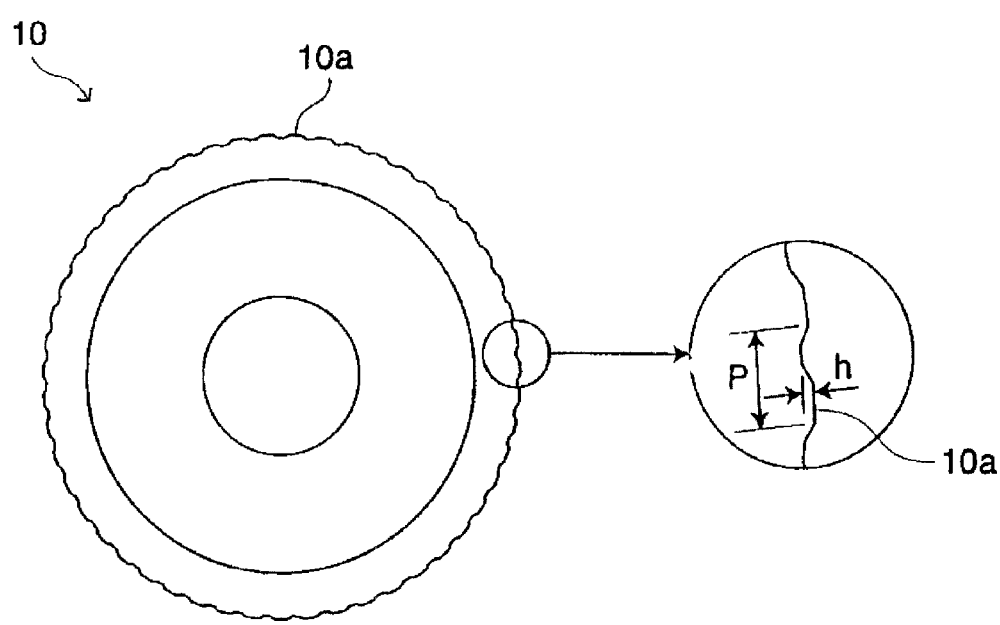
FIG. 19 is a side diagram showing the cutter wheel of FIG. 18.

Here, FIG. 17 is a diagram showing an example of a conventional device used to engrave notches in a cutter wheel.

As shown in FIG. 17, a disk-like grinding stone Z supported around the rotational axis of a motor M in a polishing device 140 is made to make contact with ridge line part 20a of cutter wheel 120 perpendicular to the surface of this grinder, and thus, a trench 20b is created in the ridge line part. After that, cutter wheel 120 is pulled away; that is, downward in the figure, and then, another trench 20b is created in ridge line portion 20a, after cutter wheel 120 is rotated by a rotational angle which corresponds to pitch P.

In this manner, notches 20b are created in ridge line part 20a of cutter wheel 120, and thus, cutter wheel 20 is gained.

Here, for the sake of convenience, in the following description, the method for engraving notches in a ridge line part using engraving device 30 of FIG. 3 is referred to as rolling method, and the method for engraving notches in ridge line part 20a using polishing device 140 of FIG. 17 is referred to as polishing method.

At least one notch 20b is required for cutter wheel 20 in order to achieve excellent bite on the surface of glass substrates and the like. It is preferable for notches 20b to be created in the entirety of the periphery of the ridge line part with a pitch of more than at least 200 µm. It is preferable for the depth of the engraved notches 20b to be no greater than 5 µm. Though the outer diameter of cutter wheel 20 is not particularly limited, the outer diameter of the wheel may be 1.0 mm to 50 mm, depending on the thickness of the glass substrate, and it is particularly preferable for it to be 2.0 mm to 30 mm.

Here, when the number of notches 20b created in the entirety of the periphery of the ridge line part of cutter wheel 20 is the number of divisions n, the distance between adjacent notches 20b is pitch P and the outer diameter of cutter wheel 20 is D, P/D can be represented by the following formula.

(Formula 1)

That is to say, $\pi/n(max) < P/D < \pi/n(min)$     Formula 1

(Formula 2)

$\pi/n(max) < P/D < \pi$     Formula 2

The above described Formula 1 can be converted to the following, because n (min)=1.

(Formula 2)

$\pi/n(max) < P/D < \pi$     Formula 2

In reference to FIGS. 7 to 9, experiments conducted in order to evaluate the cutting properties of the cutter wheels according to this invention and the results thereof are described.

Experiment 1

In Experiment 1, the pitch of notches 20b in cutter wheel 20 was changed by 100 µm, and the degree of biting of the edge (ease of sliding) when inside cutting was carried out on improved large scale glass, which is the object of cutting, as described above was examined.

The conditions for Experiment 1 are shown in the following.
glass substrate G1 which is object of cutting: non-alkaline glass (single plate of glass having a thickness of 0.7 mm)
glass substrate G2 which is object of cutting: improved large scale glass (single plate of glass having a thickness of 0.63 mm)
[Cutter Wheel]
material: hard metal; outer diameter D: 3.0 mm; thickness T: 0.65 mm; diameter of hole for axis: 0.8 mm
pitch P of notches: 100 µm to 400 µm (circumference equally divided into 94 to 23)
depth h of notches: 2 µm to 3 µm
angle V of edge: 120°
method for engraving notches: above described rolling method using tool for engraving notches 31
[Scribing Device]
MS type, made by Mitsuboshi Diamond Industrial Co., Ltd.
[Set Conditions]
depth of notches in glass substrate: 0.15 mm
scribing rate: 800 mm/s
load on edge: 0.06 MPa to 0.20 MPa The occurrence of sliding of edge 2 of the cutter wheel on glass substrate G1 which is the object of cutting and glass substrate G2 which is the object of cutting when the glass substrate was scribed using the cutter wheel was evaluated from the measured value in the gained cut region.

Here, cut region in this invention is defined as a region where the load on the edge of the cutter wheel makes it possible for the glass substrate to be cut. In addition, in terms of the load on the edge, the gauge pressure (MPa) was used as the corresponding load (Kgf).

In Experiment 1, the lower limit value ($L_{TH}$) of the cut region was measured and whether the scribe line in the cut region where the high load side on the edge was 0.15 MPa and 0.20 MPa was good or not was determined.

The characteristics of the edge of the cutter wheels used as samples are shown in Table 1.

| sample No. | type of edge | pitch of notches (µm) | number of divisions in circumference |
|---|---|---|---|
| A | without notches | — | — |
| B | with notches | 100 | 94 |
| C | with notches | 200 | 47 |
| D | with notches | 300 | 31 |
| E | with notches | 400 | 23 |

FIG. 7 shows the evaluation of the degree of biting (difficulty of sliding) of cutter wheel 20 on the respective glass substrates which were the object of cutting in Experiment 1. That is to say, the results of examination of the occurrence of sliding of the edge of cuter wheel 20 on glass substrates G1 and G2 which were the objects of cutting for the respective types of edges for the respective set values in the low load region and the high load region are shown. As is clear from FIG. 7, it was found that sliding of the edge (cutter wheel 120) without notches occurred in Sample A, while no sliding of the edge of cutter wheel 20 with notches occurred in a large cut region in Samples B to E according to this invention.

In addition, it was found that the pitch of notches in cutter wheel 20 may be no less than 100 µm, and that it is preferably no less than 200 µm, in order to gain excellent biting without fail.

Experiment 2

In Experiment 2, inside cutting was carried out on a predetermined cut region in improved large scale glass as that described above using cutter wheel 120 having an edge without notches and cutter wheel 20 having notches according to this invention, and the state of scribing at this time was examined.

Conditions in Experiment 2 are shown in the following.
glass substrate which object of cutting: improved large scale glass (single plate of glass having thickness of 0.63 mm)
[Cutter Wheel]
material: hard metal and sintered diamond; outer diameter D: 3.0 mm; thickness T: 0.65 mm; diameter of hole for axis H: 0.80 mm
pitch P of notches: 300 µm (circumference equally divided into 31)
depth h of notches: 2 µm to 3 µm
angle V of edge: 120°
method for engraving notches: above described rolling method using tool for engraving notches 31
[Scribing Apparatus]
MS type, made by Mitsuboshi Diamond Industrial Co., Ltd.
[Set Conditions]
depth of notches in glass substrate: 0.10 mm
scribing rate: 800 mm/s
load on edge: 0.03 MPa to 0.20 MPa FIG. 8 shows the results of inside cutting which was carried out on a predetermined cut region in improved large scale glass as described above using cutter wheel 120 of which the material is a hard metal and which has an edge without notches in Sample F and cutter wheel having notches 20b according to this invention in Experiment 2.

Here, Sample G is a cutter wheel of which the material is a hard metal and in which notches 20b are engraved in accordance with the above described rolling method using tool for engraving notches 31, and Sample H is a wheel of which the material is sintered diamond and in which notches 20b are engraved using conventional polishing apparatus 140. Here, "<MPa" in the "cut region" shown in FIG. 8 means that cutting was possible with no less than 0.20 MPa.

As is clear from FIG. 8, it was found that sliding of the edge without notches 20b occurred in Sample F (cutter wheel 120), while no sliding of edge 2 of cutter wheel 20 having notches 20b occurred in a large cut region according to this invention. In addition, it was found that in the case where notches 20b in cutter wheel 20 were engraved in accordance with the above described rolling method, the same effects as with the polishing method using a conventional polishing device 140 could be gained.

Experiment 3

In Experiment 3, the depth of notches 20b in cutter wheel 20 was changed, and inside cutting was carried out on a predetermined cut region of improved large scale glass as that described above, and the state of scribing at this time was examined.

The conditions in Experiment 3 are shown in the following.
glass substrate which is object of cutting: improved large scale glass (single plate of glass having thickness of 0.63 mm)
[Cutter Wheel]
material: hard metal; outer diameter D: 3.0 mm; thickness T: 0.65 mm; diameter of hole for axis H: 0.8 mm
pitch P of notches: 40 μm to 9740 μm (circumference divided into 230 to 1)
depth h of notches: each depth of 1 μm, 2 μm and 3 μm
angle V of edge: 120°
method for engraving notches: above described rolling method
[Scribing Device]
MS type, made by Mitsuboshi Diamond Industrial Co., Ltd.
[Set Conditions]
depth of notches in glass substrate: 0.10 mm
scribing rate: 800 mm/s
load on edge: 0.09 MPa to 0.24 MPa FIG. 9 shows the gained cut regions and the evaluation when the depth of notches 20b in cutter wheel 20 was set to 1 μm, 2 μm and 3 μm, and inside cutting was carried out on improved large scale glass as described above in Experiment 3. Here, "<MPa" in the "cut region" shown in FIG. 9 means that cutting was possible with no less than 0.20 MPa.

As is clear from FIG. 9, it was found that it becomes difficult for sliding of the edge to occur when the depth of the notches becomes 3 μm, making stable inside cutting possible in a large cut region.

As is clear from the results of Experiments 1 to 3, it was found that excellent biting was gained when the pitch of the notches in cutter wheel 20 was no less than 100 μm, and the same effects as with the conventional polishing method could be gained, even when notches 20b were engraved in accordance with the above described rolling method. Furthermore, it was found that it becomes difficult for sliding of the edge to occur when the depth of notches 20b in cutter wheel 20 becomes 3 μm, making stable inside cutting possible in a large cut region. furthermore, it is difficult for sliding of the edge to occur, making stable inside cutting possible, when the notches become as deep as 4 μm or 5 μm, though this is not shown. In brief, stable inside cutting is possible when the depth of the notches is no more than 5 μm, preferably no less than 3 μm.

As is clear from the above described embodiments, it becomes possible to gain excellent bite and engraving of notches becomes easy when notches 20b are created so as to have a depth of no less than 3 μm and no more than 5 μm in the entirety of the periphery of the above described ridge line part.

Other Embodiments

Figure 10:
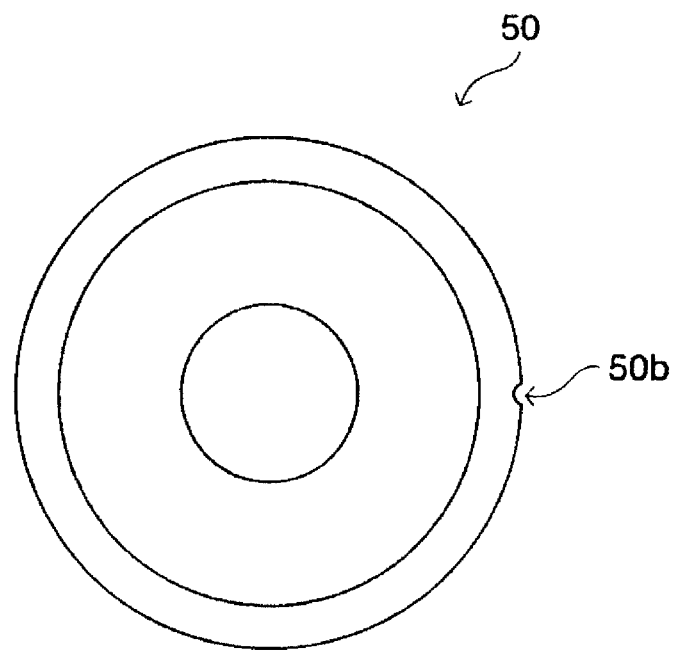
FIG. 10 is a front diagram showing a cutter wheel according to another embodiment of this invention as viewed in the direction along the rotational axis of the cutter wheel.
Figure 11:
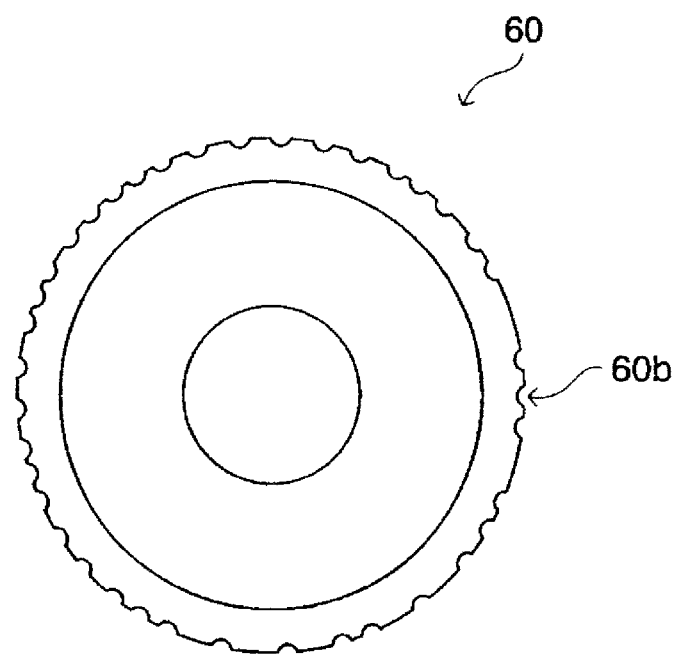
FIG. 11 is a front diagram showing a cutter wheel according to still another embodiment of this invention as viewed in the direction along the rotational axis of the cutter wheel.

In reference to FIGS. 10 and 11, cutter wheels according to other embodiments of this invention are described.

FIGS. 10 and 11 are side diagrams showing cutter wheels according to the present invention as viewed in the direction along the rotational axis of the cutter wheel.

As shown in FIG. 10, one notch 50b is created in the entirety of the periphery of ridge line part 51 of cutter wheel 50 (that is to say, the pitch of notch 50b becomes the length of the entirety of the periphery of ridge line part 51). When inside cutting, for example, is carried out with cutter wheel 50, biting of the edge can be achieved in a small range where cutter wheel 50 moves while rotating at least once.

As shown in FIG. 11, a number of notches 60b are created in the entirety of the periphery of ridge line part 51 with a random pitch and depth. Excellent biting of the edge of cutter wheel 60 can be gained. In addition, it becomes almost completely unnecessary to control the precision of the pitch and the depth of notches 60b when notches 60b are engraved, and thus, the productivity increases.

Excellent biting of cutter wheels 20 and 60 on the surface of a brittle material substrate can be gained, as shown in the above described embodiments.

That is to say, it becomes possible to gain excellent biting by creating one or more notches, each of which has a pitch of more than 200 μm.

Furthermore, when a cutter wheel is manufactured in accordance with a rolling method using the above described engraving device 30, the equipment required for engraving notches can be simplified, and the working time can be significantly shortened in comparison with the prior art. In addition, this work of engraving is not affected by any difference in the experience and personal ability of the workers, and thus, the productivity becomes high.

Here, the method for creating notches in each of cutter wheels 20 and 60 is not limited to the rolling method using the above described engraving apparatus 30, and may be a conventional polishing method, discharge processing or laser processing.

In addition, this invention includes a manual scribing tool where cutter wheel 20 or 60 for scribing a brittle material substrate according to the present invention is attached to a holder provided at an end of a hand so as to be rotatable around an axis.

Figure 12:
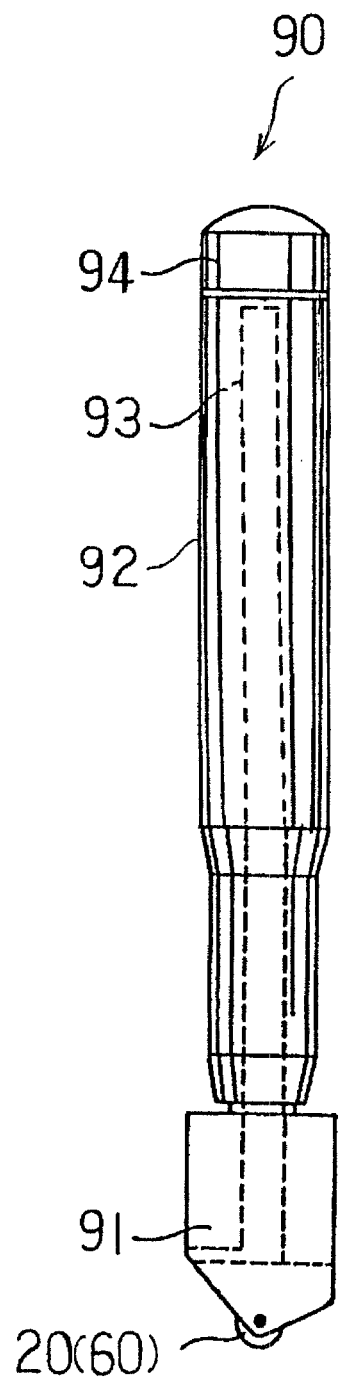
FIG. 12 is a front diagram showing a manual scribing tool according to an embodiment of this invention.

FIG. 12 is a front diagram showing the above described manual scribing tool. Manual scribing tool 90 is formed mainly of a holder 91 where cutter wheel 20 or 60 is mounted at one end so as to be replaceable, and a handle 92 in rod form to which holder 91 is attached so as to be removable.

An oil chamber 93 is formed inside handle 92, one end of which forms a part connected to holder 91 and the other end of which is provided with a removable cap 94 for the opening through which a lubricant is supplied into oil chamber 93.

Furthermore, this invention includes a scribing device with which a brittle material substrate can be scribed and where cutter wheel 20 or 60 for scribing a brittle material substrate according to the present invention is attached to a well known scribing device so as to be freely rotatable.

As this scribing device, the above described scribing device shown in FIG. 13 can be cited.

The cutter wheels of this invention are particularly effective for glass substrates made of non-alkaline glass or synthetic quartz glass, and can be applied to a variety of brittle material substrates for flat display panels, of which a typical example is TFT liquid crystal panels.

In the cutter wheels for scribing a brittle material substrate according to this invention, a V-shaped ridge line part is formed as an edge along the circumferential part of a disk-like wheel and at least one notch is engraved in the above described ridge line part, and thus, excellent biting can be gained on the surface of brittle material substrates.

Even in the case where one notch is created in the entirety of the periphery of the above described ridge line part, the bite of the edge can be made excellent, and the working time required for engraving the notches can be shortened.

In the case where a number of notches are created with a random pitch and/or depth in the entirety of the periphery of the above described ridge line part, it becomes almost completely unnecessary to control the precision at the time of manufacture, and excellent biting of the edge can be gained.

In accordance with a manufacturing method for a cutter wheel for scribing a brittle material substrate according to this invention, when at least one notch is engraved in the V-shaped ridge line part of a cutter wheel where the above described ridge line part is formed along the circumferential part of a disk-like wheel as an edge, a cutter wheel is rolled over a tool for engraving notches made of a material which is harder than the ridge line part of the above described cutter wheel where at least one protrusion is formed while making contact with protrusions as that described above while pressure is applied, and therefore, the equipment required for engraving notches can be simplified and the time for work can be significantly shortened in comparison with the prior art. In addition, this work of engraving is not affected by any difference in the experience and personal ability of the workers, and thus, the productivity becomes high.

INDUSTRIAL APPLICABILITY

The present invention can be used for the manufacture of cutter wheels used when a brittle material substrate is divided.

The invention claimed is:

1. A cutter wheel for scribing a brittle material substrate, comprising:
   a disk made of metal or sintered diamond having an outer peripheral edge having a V-shape formed by two slanted surfaces that converge in a direction toward the outer peripheral edge and having an outer diameter of 1 mm to 3 mm; and
   a plurality of notches provided in the outer peripheral edge, each of the plurality of notches having a V-shape with an angle of 30°-120° in a plane that contains the radii of the cutting wheel and a depth of the notches is 1 μm to 5 μm, a pitch of the notches being 200 μm or more,
   wherein ridge line parts are formed between adjacent notches by the two slanted surfaces that converge in the direction toward the outer peripheral edge, the ridge line parts being longer than a length of the notches in the direction of the circumference between adjacent notches.

2. The cutter wheel for scribing a brittle material substrate according to claim 1, wherein the two slanted surfaces have a microscopic unevenness where the average coarseness Ra along the center line of said unevenness exceeds 0.40 μm.

3. The cutter wheel according to claim 1, wherein the plurality of notches are provided with random depth.

4. A manual scribing tool, where the cutter wheel according to claim 1 is attached to a holder provided at an end of a handle so as to be freely rotatable around an axis.

5. An automatic scribing device, comprising a mechanism where a cutter head moves in at least one direction relative to a brittle material substrate mounted on a table, characterized in that said cutter head comprises the cutter wheel according to claim 1.

* * * * *